(12) United States Patent
Venkumahanti et al.

(10) Patent No.: US 9,208,102 B2
(45) Date of Patent: Dec. 8, 2015

(54) OVERLAP CHECKING FOR A TRANSLATION LOOKASIDE BUFFER (TLB)

(71) Applicant: QUALCOMM Incorporated, San Diego, CA (US)

(72) Inventors: Suresh K. Venkumahanti, Austin, TX (US); Erich J. Plondke, Austin, TX (US); Lucian Codrescu, Austin, TX (US); Shane M. Mahon, Austin, TX (US); Rahul R. Toley, Austin, TX (US); Fadi A. Hamdan, Austin, TX (US)

(73) Assignee: Qualcomm Incorporated, San Diego, CA (US)

( * ) Notice: Subject to any disclaimer, the term of this patent is extended or adjusted under 35 U.S.C. 154(b) by 243 days.

(21) Appl. No.: 13/741,981

(22) Filed: Jan. 15, 2013

(65) Prior Publication Data

US 2014/0201494 A1   Jul. 17, 2014

(51) Int. Cl.
    G06F 12/10 (2006.01)
(52) U.S. Cl.
    CPC ........ *G06F 12/1027* (2013.01); *G06F 12/1036* (2013.01); *G06F 2212/652* (2013.01)
(58) Field of Classification Search
    None
    See application file for complete search history.

(56) References Cited

U.S. PATENT DOCUMENTS

| 4,654,790 | A  | * | 3/1987  | Woffinden ............... 711/207 |
|-----------|----|---|---------|----------------------------------|
| 5,630,087 | A  |   | 5/1997  | Talluri et al.                   |
| 5,765,209 | A  | * | 6/1998  | Yetter ..................... 711/207 |
| 6,233,652 | B1 |   | 5/2001  | Mathews et al.                   |
| 6,560,689 | B1 |   | 5/2003  | Mathews et al.                   |
| 8,195,916 | B2 |   | 6/2012  | Bassett et al.                   |
| 2002/0144077 | A1 | * | 10/2002 | Andersson et al. ......... 711/203 |
| 2007/0005932 | A1 | * | 1/2007  | Covelli et al. ............ 711/207 |
| 2011/0138149 | A1 |   | 6/2011  | Karlsson et al.                  |
| 2011/0238947 | A1 |   | 9/2011  | Nishiguchi et al.                |
| 2011/0295587 | A1 |   | 12/2011 | Eeckhout et al.                  |

FOREIGN PATENT DOCUMENTS

WO    9612231 A1    4/1996

OTHER PUBLICATIONS

International Search Report and Written Opinion—PCT/US2014/011027—ISA/EPO—Jul. 7, 2014, 11 pages.

* cited by examiner

*Primary Examiner* — Duc Doan
(74) *Attorney, Agent, or Firm* — Toler Law Group, PC

(57) ABSTRACT

An apparatus includes a translation lookaside buffer (TLB). The TLB includes at least one entry that includes an entry virtual address and an entry page size indication corresponding to an entry page. The apparatus also includes input logic configured to receive an input page size indication and an input virtual address corresponding to an input page. The apparatus further includes overlap checking logic configured to determine, based at least in part on the entry page size indication and the input page size indication, whether the input page overlaps the entry page.

21 Claims, 6 Drawing Sheets

OVERLAP CHECKING FOR A TRANSLATION LOOKASIDE BUFFER (TLB)

I. FIELD

The present disclosure is generally related to management of translation lookaside buffers (TLBs).

II. BACKGROUND

Advances in technology have resulted in smaller and more powerful computing devices. For example, there currently exist a variety of portable personal computing devices, including wireless computing devices, such as portable wireless telephones, personal digital assistants (PDAs), tablet computers, and paging devices that are small, lightweight, and easily carried by users. Many such computing devices include other devices that are incorporated therein. For example, a wireless telephone can also include a digital still camera, a digital video camera, a digital recorder, and an audio file player. Also, such computing devices can process executable instructions, including software applications, such as a web browser application that can be used to access the Internet and multimedia applications that utilize a still or video camera and provide multimedia playback functionality. As such, these devices can perform functions typically performed by larger devices, such as desktop computers.

Processors, such as those in wireless telephones and other computing devices, often include one or more translation lookaside buffers (TLBs). A TLB may be used to cache translations between virtual addresses and physical addresses. When a specified virtual address is not found in the TLB, a new entry may be created in the TLB for the specified virtual address, where the new entry includes a corresponding physical address translation. Creating this entry can be done in hardware or by software. Alternately, an existing entry of the TLB may be overwritten with translation information for the specified virtual address. If the specified virtual address is found, i.e., matches an entry of the TLB, the TLB returns the physical address stored in the matching entry.

To maintain data consistency, it may be useful to prevent situations in which multiple entries of the TLB match an input virtual address. Conventionally, this duty falls on the operating system using the TLB. However, due to programming errors and other conditions, it may be difficult to rely upon the operating system to fulfill this duty. Moreover, some systems may concurrently execute multiple operating systems (e.g., guest operating systems in communication with a hypervisor), which may introduce further complexity in TLB management; the hypervisor may be responsible for programming a (software programmed) TLB, and the guest operating system defines the translations, but cannot be trusted to create translations that do not overlap.

III. SUMMARY

Processor-level (e.g., hardware-based) overlap checking at a TLB is disclosed. The TLB may be software-managed or hardware-managed. Overlap checking may be used in a system that supports variable page sizes, as the use of variable page sizes may make overlapping pages possible. Because the disclosed technique may be implemented in hardware, the disclosed technique may be faster than software-based overlap checks.

One or more instructions may be implemented to utilize the disclosed hardware-based overlap checking technique. For example, an overlap check instruction may be implemented. When executed by a processor, the overlap check instruction produces an output indicating whether any entries in a TLB correspond to pages that would overlap a specified input page. Thus, the overlap check instruction may be used to determine whether creating a new entry in the TLB for an input page would result in overlapping entries in the TLB. In some implementations, the output of the overlap check instruction may indicate how many entries in the TLB overlap the input page or may identify a specific overlapping entry.

As another example, a conditional TLB write instruction may be implemented. The conditional TLB write instruction may create an entry in the TLB for an input page if the created entry would not overlap any existing entries in the TLB. If creating the entry would result in overlap, the conditional TLB write instruction may produce an output similar to the output of the overlap check instruction.

In a particular embodiment, a method includes receiving an input virtual address and an input page size indication at a TLB. The input virtual address and the input page size indication correspond to an input page. The method also includes determining a computed page size based on a comparison of the input page size indication to an entry page size indication of an entry of the TLB, where the entry of the TLB corresponds to an entry page. The method further includes performing a masked comparison, based on the computed page size, of the input virtual address to an entry virtual address to determine whether the input page overlaps the entry page.

In another particular embodiment, an apparatus includes a TLB. The TLB includes at least one entry that includes an entry virtual address and an entry page size indication that correspond to an entry page. The apparatus also includes input logic configured to receive an input page size indication and an input virtual address corresponding to an input page. The apparatus further includes overlap checking logic configured to determine, based at least in part on the entry page size indication and the input page size indication, whether the input page overlaps the entry page.

In another particular embodiment, a method includes executing an overlap check instruction at a processor. The overlap check instruction includes an input virtual address and an input page size indication that correspond to an input page. Executing the overlap check instruction includes determining a computed page size based on a comparison of an entry page size indication of an entry of a TLB to the input page size indication. Executing the overlap check instruction also includes performing a masked comparison, based on the computed page size, of the input virtual address to an entry virtual address of the entry to determine whether the input page overlaps an entry page. Executing the overlap check instruction further includes outputting an execution result based on the determination whether the input page overlaps the entry page.

In another particular embodiment, a method includes executing a conditional TLB write instruction at a processor that includes a TLB. The TLB includes a first entry having an entry virtual address and an entry page size indication corresponding to an entry page. The conditional TLB write instruction includes an input virtual address and an input page size indication corresponding to an input page. Executing the conditional TLB write instruction includes determining a computed page size based on a comparison of the entry page size indication to the input page size indication. Executing the conditional TLB write instruction also includes performing a masked comparison, based on the computed page size, of the input virtual address to the entry virtual address to determine whether the input page overlaps the entry page. Executing the conditional TLB write instruction farther includes, in response to determining that the input page does not overlap the entry page, writing the input page size indication and the input virtual address to a second entry of the TLB.

In another particular embodiment, an apparatus includes means for storing at least one entry. The at least one entry includes an entry virtual address and an entry page size indication corresponding to an entry page. The apparatus also includes means for receiving an input page size indication and an input virtual address corresponding to an input page. The apparatus further includes means for determining a computed page size based, on a comparison of the entry page size indication to the input page size indication. The apparatus includes means for performing a masked comparison, based on the computed page size, of the input virtual address to the entry virtual address to determine whether the input page overlaps the entry page.

In another particular embodiment, a non-transitory processor-readable medium includes an overlap check instruction. The overlap check instruction includes an input virtual address and an input page size indication corresponding to an input page. The overlap check instruction is executable by a processor that includes a TLB to determine a computed page size based on a comparison of an entry page size indication of an entry of the TLB to the input page size indication. The overlap check instruction is also executable by the processor to perform a masked comparison, based on the computed page size, of the input virtual address to an entry virtual address of the entry to determine whether the input page overlaps an entry page. The overlap check instruction is further executable by the processor to output an execution result based on the determination whether the input page overlaps the entry page.

In another particular embodiment, a non-transitory processor-readable medium includes a conditional TLB write instruction. The conditional TLB write instruction includes an input virtual address and an input page size indication corresponding to an input page. The conditional TLB write instruction is executable by a processor that includes a TLB, the TLB including a first entry having an entry virtual address and an entry page size indication corresponding to an entry page. The conditional TLB write instruction is executable by the processor to determine a computed page size based on a comparison of the entry page size indication to the input page size indication. The conditional TLB write instruction is also executable by the processor to perform a masked comparison, based on the computed page size, of the input virtual address to the entry virtual address to determine whether the input page overlaps the entry page. The conditional TLB write instruction is further executable by the processor to, in response to determining that the input page does not overlap the entry page, write the input page size indication and the input virtual address to a second entry of the TLB.

One particular advantage provided by at least one of the disclosed embodiments is an ability to perform processor-level overlap checking at a TLB, which may increase reliability and data consistency in a computing system or electronic device without relying on potentially erroneous third-party methods (e.g., operating system TLB checks). Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
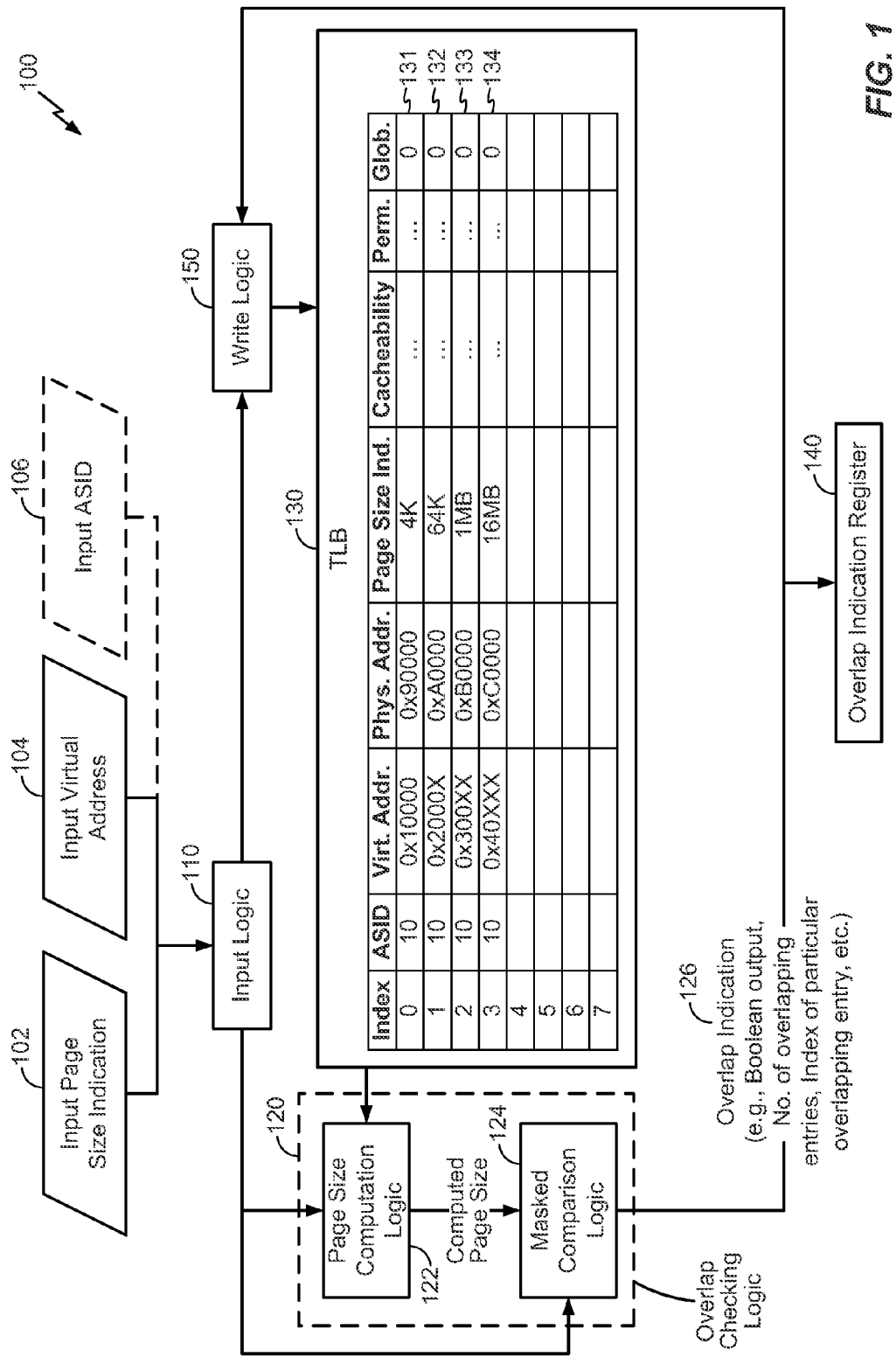
FIG. 1 is a diagram of a particular embodiment of a system that is operable to perform overlap checking for a TLB.

FIG. 1 is a diagram of a particular embodiment of a system 100 that is operable to perform overlap checking for a translation lookaside buffer (TLB). The system 100 includes a TLB 130 coupled to input logic 110, overlap checking logic 120, write logic 150, and an overlap indication register 140. In a particular embodiment, the TLB 130 is a software-managed TLB. Alternately, the TLB 130 may be a hardware-managed. TLB. In an illustrative embodiment, the system 100 of FIG. 1 and/or components thereof may be included in or coupled to a processor, such as a central processing unit (CPU) or digital signal processor (DSP). For example, the processor may be integrated into an electronic device, such as a set top box, a music player, a video player, an entertainment unit, a navigation device, a communications device, a personal digital assistant (PDA), a fixed location data unit, a computing device, or any combination thereof.

In a particular embodiment, one or more of the input logic 110, the overlap checking logic 120, and the write logic 150 are implemented using hardware (e.g., by a DSP, a CPU, a controller, a field-programmable gate array (FPGA) device, an application-specific integrated circuit (ASIC), another hardware device, or any combination thereof). Alternately, or in addition, one or more of the input logic 110, the overlap checking logic 120, and the write logic 150 may be implemented using software (e.g., instructions executable by a processor), as further described with reference to FIG. 6.

The TLB 130 may include one or more entries. In FIG. 1, the TLB 130 includes a first entry 131, a second entry 132, a third entry 133, and a fourth entry 134, where each of the entries 131-134 corresponds to a row of the TLB 130. Each entry 131-134 may include a virtual address ("Virt. Addr.") and a page size indication ("Page Size Ind."). In the illustrated example, the page size indication is represented using actual page sizes (e.g., 4 kilobytes (K), 64K, 1 megabyte (MB), 16 MB, etc.). In an alternate embodiment, page size indications may be represented using bitmasks (also referred to as "masks"), as further described herein.

The entries 131-134 of the TLB 130 may also include a physical address ("Phys. Addr.") that is mapped to the virtual address. The entries 131-134 may further include an application space identifier ("ASID"), a cacheability indication (e.g., indicating whether an entry may be cached), permissions indication(s) ("Perm.") (e.g., read permission, write permission, and/or user permission), and a global indication ("Glob."). Each entry of the TLB 130 may have an index. For example, the first entry 131 has an index of 0, the second entry 132 has an index of 1, the third entry 133 has an index of 2, and the fourth entry 134 has an index of 3.

It should be noted that in the embodiment of FIG. 1, a 32-bit address space and a 4K minimum page size are used for illustration purposes. Thus, only the twenty most significant bits (corresponding to five hexadecimal (hex) digits) are represented in the virtual address and physical address columns of the TLB 130. The twelve least significant bits (corresponding to three hex digits) of the addresses may not be used because the minimum page size is 4K, and therefore the twelve least significant bits may not be included in the TLB 130 (e.g., to save space). Thus, a virtual address in the TLB 130 may represent a virtual page number rather than a specific address of a virtual page. In alternate embodiments, a different size address space and a different minimum page size may be used.

As shown in FIG. 1, the first entry 131 corresponds to a 4K page starting at virtual address 0x10000. Thus, in terms of the 32-bit address space, the 4K page includes virtual addresses 0x10000000 to 0x10000FFF. Similarly, the second entry 132 at index 1 corresponds to a 64K page starting at virtual address 0x2000X. The capital "X" is used to indicate that any value for the hex digit represented by the capital "X" would be within the 64K page. That is, the 64K page spans the 32-bit virtual address range 0x20000000 to 0x2000FFFF. The third entry 133 at index 2 corresponds to a 1 MB page starting at virtual address 0x300XX, and the fourth entry 134 at index 3 corresponds to a 16 MB page starting at virtual address 0x40XXX.

During operation, the TLB 130 may receive TLB lookups. Typically, a TLB lookup may specify an input virtual address 104 and a TLB may return either a previously stored corresponding physical address from the TLB (if the input virtual address was found in the TLB) or a corresponding physical address that has been added to the TLB for a newly created, mapping. To illustrate, consider a TLB lookup that specifies a 64K input page represented by virtual address 0x1000X. As used herein, the term "input page" may refer to a page of memory that is represented by a TLB lookup or other read/write operation on the TLB 130. The 64K input page may span the range from 0x10000 to 0x1000F. Thus, the 64K input page may overlap the 4K entry page represented, by the first entry 131 of the TLB 130. As used herein, the term "entry page" may refer to a page of memory that is represented by an entry in the TLB 130. It should be noted that although an overlap exists, conventional TLB overlap checking methods, which receive the input virtual address 104 but not the input page size indication 102, may not detect the overlap because 0x10000 is not necessarily equal to any value represented by 0x1000X. Thus, an overlapping entry may be created in the TLB 130 for the 64K input page, which may be undesirable and may lead to undefined behavior and/or data consistency issues (e.g., because a subsequent TLB lookup may match both the first entry 131 as well as the newly created entry).

In accordance with the described overlapping checking technique, the TLB 130 may include or be coupled to input logic 110 and overlap checking logic 120. During a TLB lookup, the input logic 110 may receive the input page size indication 102 in addition to the input virtual address 104. For example, the input virtual address 104 may be 0x1000X and the input page size indication 102 may be 64K. In an alternate embodiment, the input page size indication 102 may be represented using a mask, as further described, herein.

The overlap checking logic 120 may receive the input page size indication 102 and the input virtual address 104 from the input logic 110, and may examine the entries 131-134 of the TLB 130 to determine whether any of the entries 131-134 correspond to an entry page that overlaps the input page. For example, the overlap checking logic 120 may include page size computation logic 122 and masked comparison logic 124. For each of the entries 131-134, the page size computation logic 122 may determine a computed page size (e.g., the larger of the input page size and the corresponding entry page size). For example, when checking for overlap with the first entry 131, the logic 122 may determine a computed page size of 64K, which is the larger of the input page size of 64K and the entry page size of 4K. Similarly, the computed page size for overlap checking of the remaining entries 132-134 may be 64K, 1 MB, and 16 MB, respectively.

The masked comparison logic 124 may receive the computed page size and may perform a masked comparison, based on the computed page size, of the input virtual address 104 to the virtual address of the first entry 131 to check for overlap. To illustrate, for the first entry 131, because the computed size is 64K, the masked comparison logic 124 may mask off the last (e.g., least significant) hex digit of the input virtual address 0x1000X and the entry virtual address 0x10000. Because the two virtual addresses are equal when the last hex digit is masked off (i.e., 0x1000=0x1000), the overlap checking logic 120 may conclude that the 64K input page overlaps the 4K entry page represented in the first entry 131. The overlap checking logic 120 may similarly examine the remaining entries 132-134 of the TLB 130. Alternately, the overlap checking logic 120 may stop examination of TLB entries once an overlap is detected.

The overlap checking logic 120 may generate an overlap indication 126 that indicates the result of the overlap checking. For example, the overlap indication 126 may be a Boolean (e.g., true/false) output indicating whether or not at least one overlap was detected. As another example, the overlap indication 126 may indicate a number of entries in the TLB 130 that resulted in overlap. To illustrate, the overlap indication 126 may be a counter that is incremented each time an entry of the TLB 130 results in overlap. As yet another example, the overlap indication 126 may indicate the index of a particular overlapping entry. To illustrate, when an entry of the TLB 130 results in overlap, the overlap indication 126 may be set to the index of the entry. In a particular embodiment, the overlap indication 126 may be stored in the overlap indication register 140 or may be stored in a reserved bit of a processor architecture.

When none of the entries 131-134 of the TLB 130 result in overlap, a new entry may be created in the TLB 130 for the input page. For example, the write logic 150 may receive the input page size indication 102 and the input virtual address 104 from the input logic 110, and may receive the overlap indication 126 from the overlap checking logic 120 indicating that no overlap was detected. In response, the write logic 150 may create a new entry in the TLB 130 for the input page. Alternately, if the TLB 130 is "full," the write logic 150 may overwrite an existing (e.g., oldest, least recently used, etc.) entry of the TLB 130 with the virtual-to-physical address mapping for the input page. When an overlap is detected, the write logic 150 may refrain from modifying the TLB 130.

It should be noted that although the previous description of FIG. 1 uses page sizes (e.g., 4K, 64K, etc.) for the input page size indication 102 and for the page size indications stored in the TLB 130, an alternate embodiment may involve representing page sizes as bitmasks. In such an embodiment, the page size computation logic 122 may determine the larger of two page sizes by logically ANDing the masks. The resulting computed mask may be used by the masked comparison logic 124 when checking for overlap. To illustrate, in the example above when masks are used instead of page sizes, the input virtual address 104 may remain 0x1000X but the input page size indication 102 may be FFFF0 instead of 64K. The page size indication for the first entry 131 may be FFFFF instead of 4K. The page size computation logic 122 may perform a logical AND operation on the two masks to generate a computed mask of FFFF0 (i.e., FFFFF AND FFFF0=FFFF0). The masked comparison logic 124 may use the computed mask of FFFF0 when comparing the input virtual address 104 to the virtual address of the first entry 131. When the computed mask of FFFF0 is used, the last (e.g., least significant) hex digit of both virtual addresses may be masked off prior to comparison, resulting in the same affirmative determination of overlap (i.e., because 0x1000=0x1000).

In a particular embodiment, the TLB 130 may include a global indication item and an ASID item in each entry 131-134. For example, when the system 100 of FIG. 1 is used in conjunction with a hypervisor, different ASIDs may correspond to different guest operating systems and may be treated as an extension to a virtual address. To illustrate, if ASIDs are supported, the virtual address for the first entry 131 may be 0x1010000, and the input virtual address for the 64K input page in the example above may be 0x101000X. When ASIDs are supported, the input logic 110 may receive an input ASID 106 in addition to the input page size indication 102 and the input virtual address 104. When the global indication of a particular entry of the TLB 130 has a first value (e.g., 1), the overlap checking logic 120 may compare the input ASID 106 and the entry ASID during overlap checking. When the global indication has a second value (e.g., 0), the overlap checking logic 120 may ignore (e.g., mask off and/or refrain from comparing) the ASIDs when determining whether the input page overlaps the entry page.

The system 100 of FIG. 1 may thus enable overlap checking at the TLB 130, which may increase reliability and data consistency in a computing system or electronic device. Moreover, because the system 100 of FIG. 1 may enable such overlap checking at the processor level (e.g., using logic modules within or coupled to the TLB 130), the system 100 of FIG. 1 may enable TLB overlap checking without relying on potentially erroneous third-party methods. Thus, the system 100 of FIG. 1 may provide protection from an operating system or application that attempts to create overlapping TLB entries.

The system 100 of FIG. 1 may be preferable to overlap checking methods that examine data and instructions that are "in flight" in a processor (e.g., in a TLB miss queue or a TLB write queue) instead of entries that are already in the TLB. For example, examining data/instructions that are in flight may result in retrying operations once overlap errors are fixed. In addition, checking a TLB miss/write queue may be computationally expensive in a multithreaded system.

In a particular embodiment, one or more processor-executable instructions may trigger and/or use the overlap checking operations described with reference to FIG. 1. For example, an overlap checking instruction and a conditional TLB write instruction may be executed. The overlapping checking instruction may include an input virtual address and an input page size indication. The overlap checking instruction may produce a Boolean output (e.g., indicating whether any entry overlaps the input page), identify a specific entry that overlaps the input page, identify how many entries overlap the input page, etc. In some implementations, the output may be stored in a register of the processor (e.g., the overlap indication register 140).

The conditional TLB write instruction may also include an input virtual address and an input page size indication corresponding to an input page. If the input page matches an entry page, the conditional TLB write instruction may produce an output similar to the output of the overlap checking instruction. If no overlap is detected, the conditional TLB write instruction may write a new entry into the TLB for the input page or may modify an existing entry in the TLB to reflect the input page.

In a particular embodiment, the overlap checking instruction and/or the conditional TLB write instruction may be executed in a single sampling cycle. For example, the instruction(s) may represent atomic events with respect to a content-addressable memory (CAM) portion of the TLB.

Figure 2:
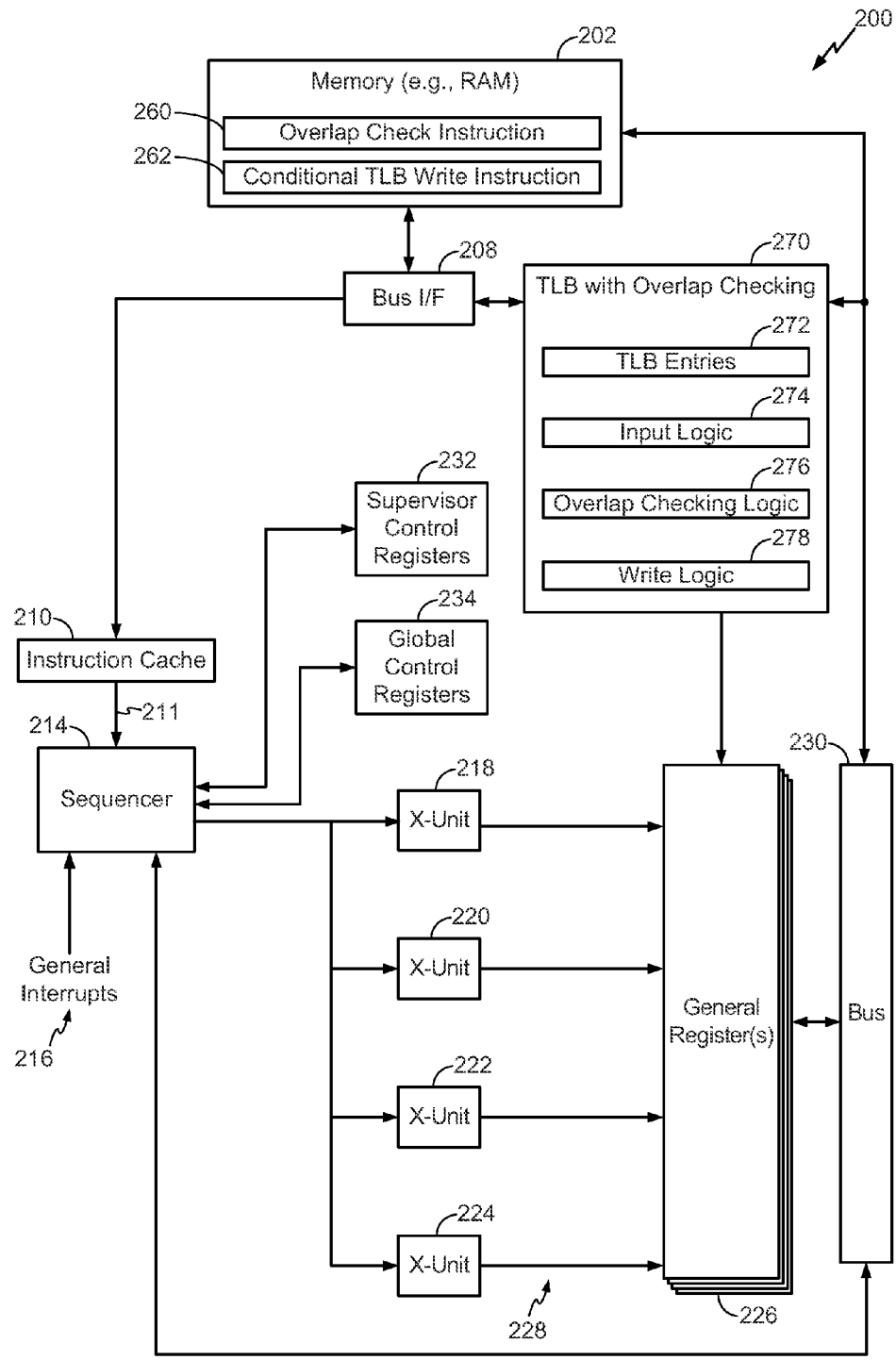
FIG. 2 is a diagram of a particular embodiment of a system that that is operable to perform overlap checking for a TLB and that includes a processor that is operable to execute an overlap check instruction and a conditional TLB write instruction.

FIG. 2 is a diagram of a particular embodiment of a system 200 that is operable to execute an overlap checking instruction and a conditional TLB write instruction. The system 200 includes a memory 202 that may be coupled to an instruction cache 210 via a bus interface (I/F) 208. In a particular embodiment, all or a portion of the system 200 may be integrated into a processor. Alternately, the memory 202 may be external to the processor.

The memory 202 may send instructions to the instruction cache 210 via the bus interface 208. The instruction cache 210 may be coupled to a sequencer 214 via a bus 211. The sequencer 214 may receive general interrupts 216, which may be retrieved from an interrupt register (not shown). In a particular embodiment, the instruction cache 210 may be coupled to the sequencer 214 via a plurality of current instruction registers (not shown), which may be coupled to the bus 211 and may be associated with particular threads (e.g., hardware threads) of the processor. In a particular embodiment, the processor may be an interleaved multithreaded processor including multiple hardware threads.

A data cache may also be coupled to the memory 202 via the bus interface 208. In a particular embodiment, the system 200 includes a TLB 270 that includes overlap checking. For example, the TLB 270 may include TLB entries 272 (e.g., the TLB entries 131-134 of FIG. 1), input logic 274 (e.g., the input logic 110 of FIG. 1), overlap checking logic 276 (e.g., the overlap checking logic 120 of FIG. 1), and write logic 278 (e.g., the write logic 150 of FIG. 1).

In a particular embodiment, the bus 211 may be a one-hundred and twenty-eight bit (128-bit) bus and the sequencer 214 may be configured to retrieve instructions from the memory 202 via instruction packets that each include one or more instructions. The bus 211 may be coupled to a first instruction execution unit (X-Unit) 218, a second instruction execution unit 220, a third instruction execution unit 222, and a fourth instruction execution unit 224. It should be noted that there may be fewer or more than four instruction execution units. Each instruction execution unit 218-224 may include operational logic, such as load/store logic and/or arithmetic-logic units (ALUs). Each instruction execution unit 218-224 may be coupled to a general register file 226 via a bus 228. The general register file 226 may also be coupled to the sequencer 214, the TLB 270, and the memory 202 via a bus 230, as shown.

The system 200 may also include supervisor control registers 232 and global control registers 234 to store bits that may be accessed by control logic within the sequencer 214 to determine whether to accept interrupts (e.g., the general interrupts 216) and to control execution of instructions.

During operation, executable instructions may be fetched from the memory 202 and stored in the instruction cache 210. For example, the instructions may include an overlap check instruction 260 and/or a conditional TLB write instruction 262. During execution, each of the instructions 260-262 may cause overlap checking operations to be performed at the TLB 270.

For example, the overlap check instruction 260 may include an opcode (e.g., "TLBOC"), an input virtual address, and an input page size indication corresponding to an input page. If ASIDs are supported, the overlap check instruction 260 may also include an input ASID. During execution of the overlap check instruction 260, the input logic 274 may receive the input virtual address, the input page size indication, and the input ASID (if any). The overlap checking logic 276 may examine the TLB entries 272 to determine whether any of the TLB entries 272 correspond to entry pages that overlap the input page. The overlap checking logic 276 may generate an instruction execution result indicating the result of overlap checking (e.g., a Boolean output, a number of overlapping entries, an index of a particular overlapping entry, etc.). The instruction execution result may be stored in a storage device (e.g., the memory 202 or in the general register file 226). It should be noted that unlike the conditional TLB write instruction 262, the overlap check instruction 260 may be a "read-only" instruction that does not modify the TLB entries 272.

The conditional TLB write instruction 262 may include an opcode (e.g., "TLBCW"), an input virtual address, and an input page size indication corresponding to an input page. If ASIDs are supported, the conditional TLB write instruction 262 may also include an input ASID. During execution of the conditional TLB write instruction 262, the input logic 274 may receive the input virtual address, the input page size indication, and the input ASID (if any). The overlap checking logic 276 may examine the TLB entries 272 to determine whether any of the TLB entries 272 correspond to entry pages that overlap the input page. When the overlap checking logic 276 determines that at least one entry page overlaps the input page, the overlap checking logic 276 may output an instruction execution result that indicates a TLB write failure. When the overlap checking logic 276 does not detect an overlap, the overlap checking logic 276 may write the input page size indication, the input virtual address, and the input ASID (if any) to one of the TLB entries 272 (e.g., after a mapping for the input page is created in a memory, such as the memory 202).

The system 200 of FIG. 2 may thus be used to implement an instruction set architecture (ISA) that includes one or more instructions that trigger TLB overlap checking. The system 200 of FIG. 2 may provide processor designers and application developers access to hardware-based TLB overlap checking features.

Figure 3:
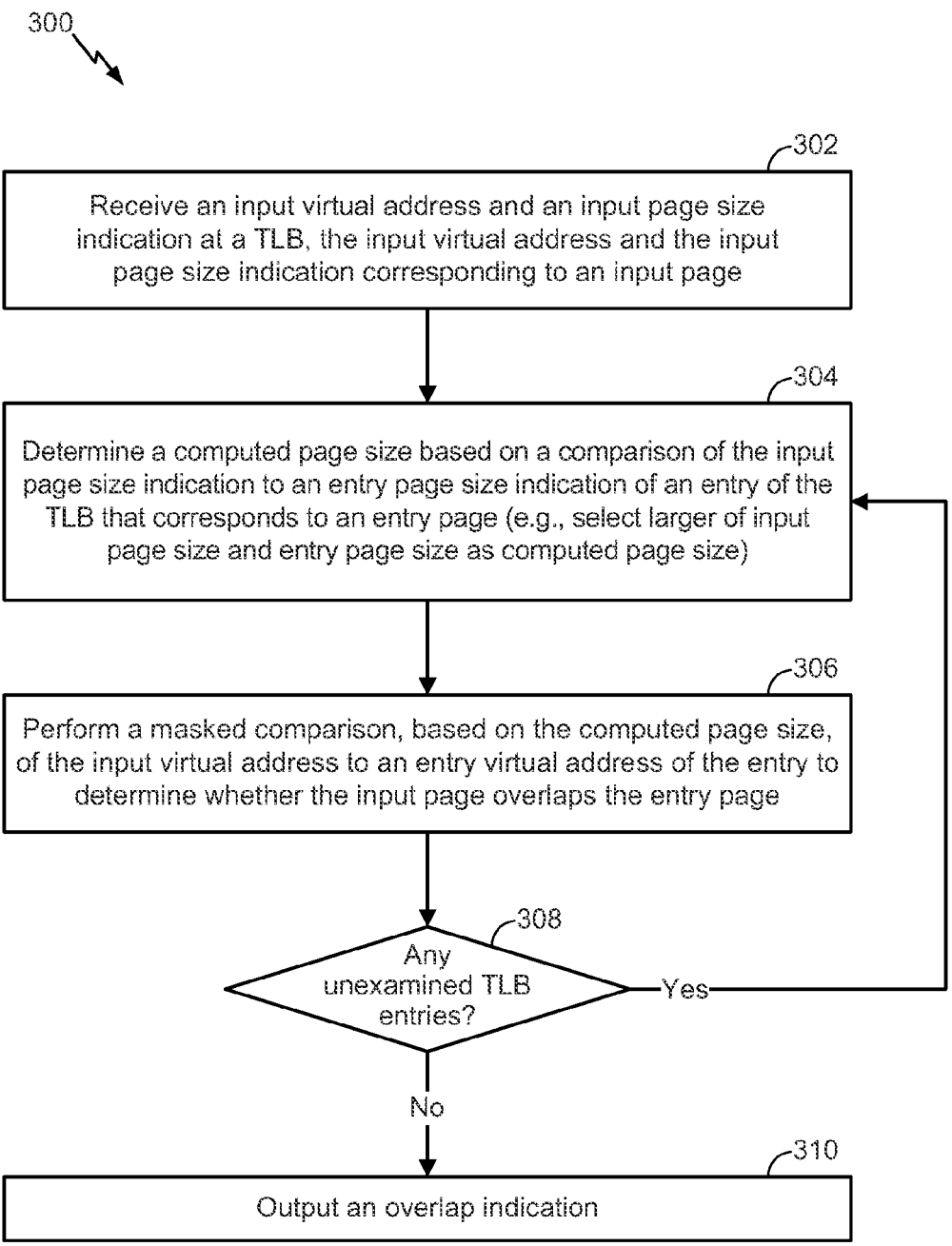
FIG. 3 is a flowchart of a particular embodiment of a method of performing overlap checking for a TLB.

FIG. 3 is a flowchart of a particular embodiment of a method 300 of performing overlap checking for a TLB. In an illustrative embodiment, the method 300 may be performed at the system 100 of FIG. 1 or the system 200 of FIG. 2.

The method 300 may include receiving an input virtual address and an input page size indication at a TLB, at 302. The input virtual address and the input page size indication correspond to an input page. For example, in FIG. 1, the input logic 110 may receive the input page size indication 102 and the input virtual address 104. To illustrate, the input page size indication 102 may be 1 MB and the input virtual address 104 may be 0x200XX.

The method 300 may also include determining a computed page size based on a comparison of the input page size indication to an entry page size indication of an entry of the TLB that corresponds to an entry page, at 304. In a particular embodiment, a larger of an input page size and an entry page size may be selected as the computed page size. For example, the page size computation logic 122 may, for the first entry 131, determine the computed page size to be 1 MB, which is the larger of the 1 MB input page size and the 4K entry page size for the first entry 131.

The method 300 may further include performing a masked comparison, based on the computed page size, of the input virtual address to an entry virtual address of the entry to determine whether the input page overlaps the entry page, at 306. For example, in FIG. 1, the masked comparison logic 124 may, for the first entry 131, perform a masked comparison of the input virtual address 0x200XX and the entry virtual address 0x10000, Because the computed page size is 1 MB, the two least significant (e.g., rightmost) hexadecimal digits may be masked off prior to the comparison. Thus, for the first entry 131, the comparison may be between 0x200 and 0x100, and the overlap checking logic 120 may determine that no overlap exists between the input page and the entry page represented by the first entry 131.

The method 300 may include determining whether any unexamined, entries of the TLB remain, at 308. If no unexamined entries remain, the method 300 may include outputting an overlap indication, at 310. For example, the overlap indication may be a Boolean output, a number of overlapping entries, an index of a particular overlapping entry, or some other overlap indication. Alternately, an overlap indication may be output if an overlap was detected, and absence of the overlap indication may indicate that no overlap was detected.

If there are still unexamined entries in the TLB, the method 300 may return to 304. For example, in FIG. 1, the overlap checking logic may examine the remaining entries 132-134 of the TLB 130. In the case of the second entry 132, the computed page size may be 1 MB, which is the larger of the 1 MB input page size and the 64K entry page size. In response, the masked, comparison logic 124 may mask off the two least significant hexadecimal digits of the input virtual address 0x200XX and the entry virtual address 0x2000X. Because the resulting values match (i.e., 0x200=0x200), the overlap checking logic 200 may detect an overlap (e.g., that the entry page represented, by the second entry 132 includes the input page).

In a particular embodiment, the method 300 of FIG. 3 may be implemented, by a DSP, a CPU, a controller, a field-programmable gate array (FPGA) device, an application-specific integrated circuit (ASIC), another hardware device, a firmware device, or any combination thereof. As an example, the method 300 of FIG. 3 can be performed by a processor that executes instructions, as described with respect to FIG. 6.

Figure 4:
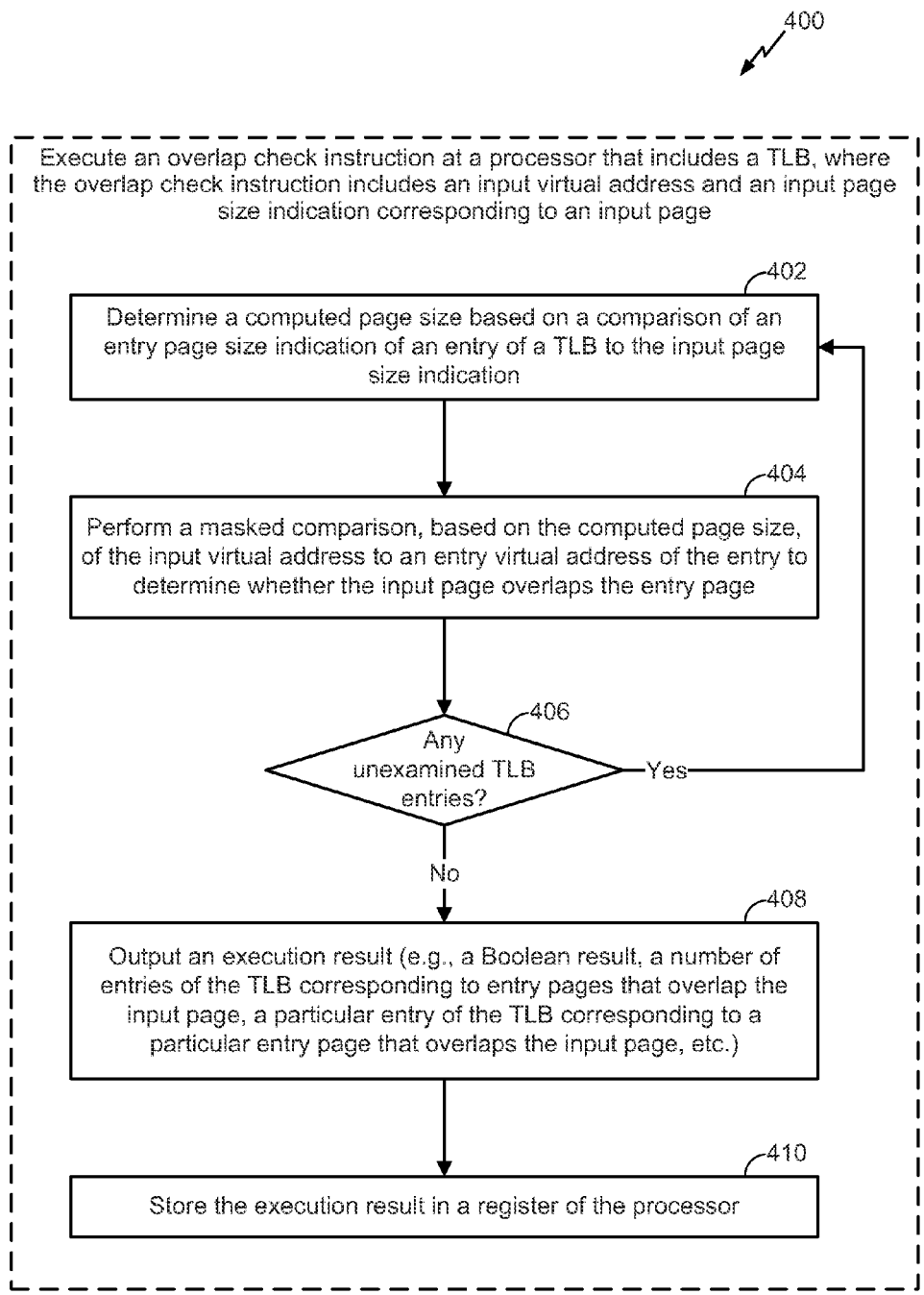
FIG. 4 is a flowchart of a particular embodiment of a method of executing an overlap check instruction.

FIG. 4 is a flowchart of a particular embodiment of a method 400 of executing an overlap check instruction. In an illustrative embodiment, the method 400 may be performed at the system 100 of FIG. 1 or the system 200 of FIG. 2.

Each operation illustrated in FIG. 4 may be performed during execution of an overlap check instruction at a processor. The overlap check instruction may include an input virtual address and an input page size indication corresponding to an input page. The method 400 may include determining a computed, page size based, on a comparison of an entry page size indication of an entry of a TLB to the input page size indication, 402. For example, in FIG. 2, during execution of the overlap check instruction 260, the overlap checking logic 276 may determine a computed page size based on a comparison of an entry page size indication of one of the TLB entries 272 and the input page size indication.

The method 400 may also include performing a masked comparison, based on the computed page size, of the input virtual address to an entry virtual address of the entry to determine whether the input page overlaps the entry page, at 404. For example, in FIG. 2, the overlap checking logic 276 may perform a masked comparison based on the computed page size.

The method 400 may further include determining whether any unexamined entries of the TLB remain, at. 406. In a particular embodiment, all entries of the TLB may be examined at the same time. If there are still unexamined, entries in the TLB, the method 400 may return to 402. If no unexamined entries remain, the method 400 may include outputting an execution result, at 408, and storing the execution result in a register of the processor, at 410. For example, in FIG. 2, the overlap checking logic 276 may store an execution result in the general register file 226. The execution result may be a Boolean result, a number of entries of the TLB corresponding to entry pages that, overlap the input page, a particular entry of the TLB corresponding to a particular entry page that overlaps the input page, etc. In an alternate embodiment, once an overlap is identified, the method 400 may output an overlap indication and terminate instead of continuing to examine additional TLB entries. The method 400 of FIG. 4 may thus enable execution of an overlap check instruction to determine whether creating a new entry in a TLB for an input page would result in overlapping entries in the TLB.

In a particular embodiment, the method 400 of FIG. 4 may be implemented by a DSP, a CPU, a controller, a field-programmable gate array (FPGA) device, an application-specific integrated circuit (ASIC), another hardware device, a firmware device, or any combination thereof. As an example, the method 400 of FIG. 4 can be performed by a processor that executes instructions, as described with respect to FIG. 6.

Figure 5:
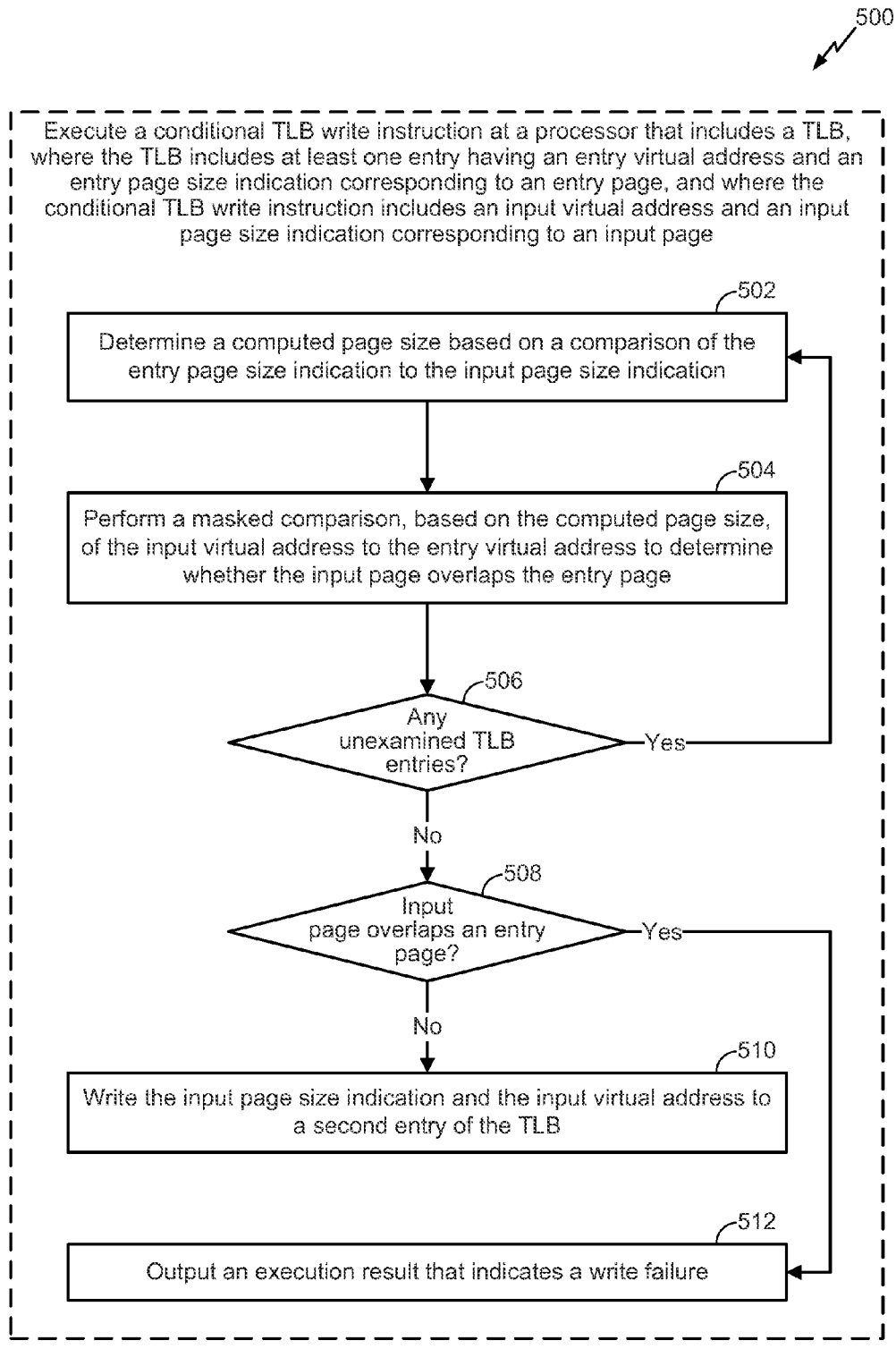
FIG. 5 is a flowchart of a particular embodiment of a method of executing a conditional TLB write instruction.

FIG. 5 is a flowchart of a particular embodiment of a method 500 of executing a conditional TLB write instruction. In an illustrative embodiment, the method 500 may be performed at the system 100 of FIG. 1 or the system 200 of FIG. 2.

Each operation illustrated in FIG. 5 may be performed during execution of a conditional TLB write instruction at a processor that includes a TLB. The TLB may include at least one entry having an entry virtual address and an entry page size indication corresponding to an entry page. The conditional TLB write instruction may include an input virtual address and an input page size indication corresponding to an input page. The method 500 may include determining a computed page size based on a comparison of the entry page size indication to the input page size indication, at 502. For example, in FIG. 2, during execution of the conditional TLB write instruction 262, the overlap checking logic 276 may determine a computed page size based on a comparison of an entry page size indication of one of the TLB entries 272 and the input page size indication.

The method 500 may also include performing a masked comparison, based on the computed page size, of the input virtual address to an entry virtual address of the entry to determine whether the input page overlaps the entry page, at 504. For example, in FIG. 2, the overlap checking logic 276 may perform a masked comparison based on the computed page size.

The method 500 may further include determining whether any unexamined entries of the TLB remain, at 506. In an alternate embodiment, once an overlap is identified, the method 500 may output an overlap indication and terminate instead, of continuing to examine additional TLB entries. If there are still unexamined entries in the TLB, the method 500 may return to 502. If no unexamined entries remain, the method 500 may include determining whether the input page overlaps at least one entry page, at 508.

When no entry page overlaps the input page, the method 500 may include writing the input page size indication and the input virtual address to a second entry of the TLB, at 510. When at least one entry page overlaps the input page, the method 500 may include outputting an execution result that indicates a write failure, at 512. The method 500 of FIG. 5 may thus enable execution of a single instruction to check for overlap in a TLB and to create a new entry in the TLB if no overlap is detected.

In a particular embodiment, the method 500 of FIG. 5 may be implemented by a DSP, a CPU, a controller, a field-programmable gate array (FPGA) device, an application-specific integrated circuit (ASIC), another hardware device, a firmware device, or any combination thereof. As an example, the method 500 of FIG. 5 can be performed by a processor that executes instructions, as described with respect to FIG. 6.

Figure 6:
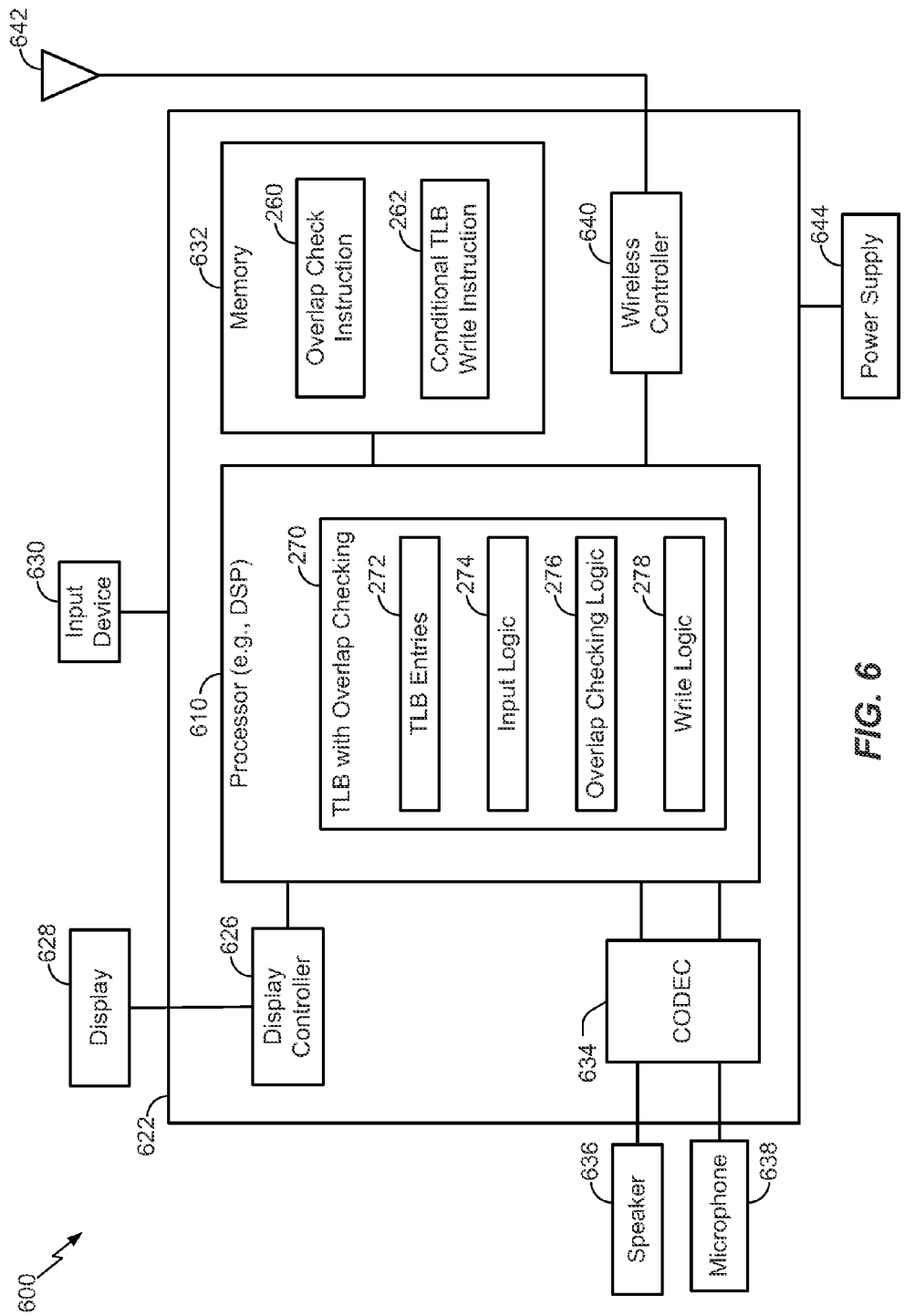
FIG. 6 is a block diagram of a wireless device including components operable to perform overlap checking for a TLB.

Referring to FIG. 6, a block diagram of an electronic device 600 is shown. In a particular embodiment, the electronic device 600, or components thereof, may be included in a communications device, a computing device, a personal digital assistant (PDA), an entertainment unit, a set top box, a music player, a video player, a navigation device, a fixed location data unit, or any combination thereof.

The electronic device 600 includes a processor (e.g., a DSP) 610 coupled to a memory 632. The processor 610 may be a multicore processor and/or include multiple hardware threads. For example, the processor 610 may support interleaved, multithreaded execution.

FIG. 6 includes a display controller 626 that is coupled to the processor 610 and to a display 628. A coder/decoder (CODEC) 634 may be coupled to the processor 610. A speaker 636 and a microphone 638 can be coupled to the CODEC 634. FIG. 6 also indicates that a wireless controller 640 can be coupled to the processor 610 and to an antenna 642 (e.g., via a radio frequency (RF) interface).

The memory 632 may be a tangible non-transitory computer-readable or processor-readable storage medium that includes executable instructions. The instructions may be executed by a processor, such as the processor 610, to perform various functions and methods described herein, including the methods 300, 400, and 500 of FIGS. 3, 4, and 5. For example, the memory 632 may store the overlap check instruction 260 and the conditional TLB write instruction 262. Execution of the instructions 260 and 262 may trigger overlap checking operations at the TLB 270 of the processor 610. For example, such overlap checking operations may involve the TLB entries 272, the input logic 274, the overlap checking logic 276, and/or the write logic 278, as described with reference to FIG. 2.

In a particular embodiment, the processor 610, the display controller 626, the memory 632, the CODEC 634, and the wireless controller 640 are included, in a system-in-package or system-on-chip device 622. In a particular embodiment, an input device 630 and a power supply 644 are coupled to the system-on-chip device 622. Moreover, in a particular embodiment, as illustrated in FIG. 6, the display 628, the input device 630, the speaker 636, the microphone 638, the antenna 642, and the power supply 644 are external to the system-on-chip device 622. However, each of the display 628, the input device 630, the speaker 636, the microphone 638, the antenna 642, and the power supply 644 can be coupled to a component of the system-on-chip device 622, such as an interface or a controller.

In conjunction with the described embodiments, an apparatus includes means for storing at least one entry. The at least one entry includes an entry virtual address and an entry page size indication corresponding to an entry page. For example, the means for storing may be the TLB 130 of FIG. 1, the TLB 270 of FIG. 2, another device or module configured to store data, or any combination thereof.

The apparatus may also include means for receiving an input page size indication and an input virtual address corresponding to an input page. For example, the means for receiving may include the input logic 110 of FIG. 1, the input logic 274 of FIG. 2, another device or module configured to receive data, or any combination thereof.

The apparatus may further include means for determining a computed page size based on a comparison of the entry page size indication to the input page size indication. For example, the means for determining may include the page size computation logic 122 of FIG. 1, the overlap checking logic 276 of FIG. 2, another device or module configured to compute a page size, or any combination thereof.

The apparatus may include means for performing a masked comparison, based on the computed page size, of the input virtual address to the entry virtual address to determine whether the input page overlaps the entry page. For example, the means for performing a masked comparison may include the masked comparison logic 124 of FIG. 1, the overlap checking logic 276 of FIG. 2, another device or module configured to perform a masked comparison, or any combination thereof.

Those of skill would further appreciate that the logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled, artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), a digital versatile disc (DVD), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined, by the following claims.

What is claimed is:

1. A method of managing a translation lookaside buffer, the method comprising:
receiving an input virtual address and an input page size indication at a translation lookaside buffer (TLB), the input virtual address and the input page size indication corresponding to an input page;
determining a larger of an input page size represented by the input page size indication and an entry page size represented by an entry page size indication of an entry of the TLB, wherein the entry of the TLB corresponds to an entry page;
selecting the determined larger of the input page size and the entry page size as a first selected page size;
performing a first masked comparison, based on the first selected page size, of the input virtual address to an entry virtual address of the entry; and
after performing the first masked comparison, selectively performing a second masked comparison based on a determination, by the TLB, that the TLB contains an unexamined entry.

2. The method of claim 1, wherein performing the first masked comparison includes:
determining a number of bits to be masked off of both the input virtual address and the entry virtual address, the number of bits based on the first selected page size; and
determining whether the input page overlaps the entry page.

3. The method of claim 1, further comprising, after determining the TLB contains the unexamined entry:
comparing a second entry page size indication of a second entry of the TLB to the input page size indication to identify a larger of the input page size and a second entry page size, wherein the second entry of the TLB corresponds to a second entry page;
selecting the identified larger of the input page size and the second entry page size as a second selected page size; and
performing the second masked comparison, based on the second selected page size, of the input virtual address to a second entry virtual address of the second entry to determine whether the input page overlaps the second entry page, wherein performing the second masked comparison includes determining a second number of bits to be masked off of both the input virtual address and the second entry virtual address based on the second selected page size.

4. The method of claim 3, wherein the first selected page size is different than the second selected page size, and wherein the first selected page size corresponds to the input page size and the second selected page size corresponds to the second entry page size.

5. The method of claim 3, further comprising, prior to comparing the second entry page size indication to the input page size indication, identifying the second entry page as an unexamined entry of the TLB.

6. An apparatus comprising:
a processor configured to execute an overlap check instruction, the overlap check instruction including an input page size indication and an input virtual address corresponding to an input page, the processor including:
a translation lookaside buffer (TLB) comprising at least one entry, the at least one entry including an entry virtual address and an entry page size indication corresponding to an entry page;
input logic configured to receive the input page size indication and the input virtual address; and overlap checking logic configured to:
  determine a larger of an input page size represented by the input page size indication and an entry page size represented by the entry page size indication;
  select the determined larger of the input page size and the entry page size as a selected page size;
  determine, based on the selected page size, a result of the overlap check instruction, where the result is based on whether the input page overlaps the entry page; and
  after the result of the overlap check is determined, selectively determine a second result of a second overlap check based on a determination, by the TLB, that the TLB contains an unexamined entry; and
a register configured to receive one or more results from the overlap checking logic.

7. The apparatus of claim 6, wherein the at least one entry further includes an application space identifier (ASID) and a global indication, wherein the input logic is further configured to receive an input ASID, and wherein the overlap checking logic is further configured to:
  in response to the global indication having a first value, determine whether the input page overlaps the entry page based on a comparison of the ASID to the input ASID; and
  in response to the global indication having a second value, determine whether the input page overlaps the entry page independent of the ASID and the input ASID.

8. The apparatus of claim 6, wherein the input page size indication is represented by a first mask or the input page size, and wherein the entry page size indication is represented by a second mask or the entry page size.

9. The apparatus of claim 6, wherein the at least one entry includes a physical address that is mapped to the entry virtual address, an application space identifier (ASID), a cacheability indication, a permissions indication, a global indication, or any combination thereof.

10. The apparatus of claim 6, wherein the overlap checking logic includes dedicated overlap checking logic stored at the processor.

11. A method of performing an overlap check instruction, the method comprising:
  executing an overlap check instruction at a processor, wherein the overlap check instruction includes an input virtual address and an input page size indication corresponding to an input page, and wherein executing the overlap check instruction includes:
    determining a larger of an input page size represented by the input page size indication and an entry page size represented by an entry page size indication of an entry of a translation lookaside buffer (TLB);
    selecting the determined larger of the input page size and the entry page size as a first selected page size;
    performing a masked comparison, based on the first selected page size, of the input virtual address to an entry virtual address of the entry to determine whether the input page overlaps an entry page;
    after performing the masked comparison, selectively performing a second masked comparison based on a determination, by the TLB, that the TLB contains an unexamined entry; and
    outputting an execution result based on the determination whether the input page overlaps the entry page and based on the determination that the TLB does not contain the unexamined entry; and
  selectively updating the TLB based on the execution result, wherein selectively updating the TLB includes writing the input page size indication and the input virtual address to a second entry of the TLB responsive to the execution result indicating no overlap.

12. The method of claim 11, further comprising selectively updating the TLB based on the execution result, wherein selectively updating the TLB includes maintaining the TLB responsive to the execution result indicating an overlap, and wherein the execution result comprises a Boolean output.

13. The method of claim 11, wherein the processor includes dedicated overlap checking logic to execute the overlap check instruction, and wherein executing the overlap check instruction further comprises storing the execution result in a register of the processor.

14. A method of performing a conditional translation lookaside buffer write instruction, the method comprising:
  executing a conditional translation lookaside buffer (TLB) write instruction at a processor that includes a TLB, wherein the TLB includes a first entry having an entry virtual address and an entry page size indication corresponding to an entry page, and wherein the conditional TLB write instruction includes an input virtual address and an input page size indication corresponding to an input page,
  wherein executing the conditional TLB write instruction comprises:
    determining a larger of an input page size represented by the input page size indication and an entry page size represented by the entry page size indication;
    selecting the determined larger of the input page size and the entry page size as a first selected page size;
    performing a masked comparison, based on the first selected page size, of the input virtual address to the entry virtual address to determine whether the input page overlaps the entry page;
    after performing the masked comparison, selectively performing a second masked comparison based on a determination, by the TLB, that the TLB contains an unexamined entry; and
    in response to determining that the input page does not overlap the entry page and to determining that the TLB does not contain the unexamined entry, writing the input page size indication and the input virtual address to a second entry of the TLB.

15. The method of claim 14, wherein executing the conditional TLB write instruction further comprises, in response to determining that the input page overlaps the entry page, outputting an execution result that indicates a write failure, and wherein the execution result identifies a number of entries of the TLB corresponding to one or more entry pages that overlap the input page, identifies a particular entry of the TLB corresponding to a particular entry page that overlaps the input page, or a combination thereof.

16. A non-transitory processor-readable medium comprising:
  an overlap check instruction;
  wherein the overlap check instruction includes an input virtual address and an input page size indication corresponding to an input page; and
  wherein the overlap check instruction is executable by a processor that includes a translation lookaside buffer (TLB) to:
    determine a larger of an input page size represented by the input page size indication and an entry page size represented by an entry page size indication of an entry page of the TLB;
    select the determined larger of the input page size and the entry page size as a selected page size;

perform a masked comparison, based on the selected page size, of the input virtual address to an entry virtual address of the entry to determine whether the input page overlaps the entry page;

after the masked comparison is performed, selectively perform a second masked comparison based on a determination, by the TLB, that the TLB contains an unexamined entry; and output an execution result based in part on the masked comparison.

17. The non-transitory processor-readable medium of claim 16, wherein the execution result identifies at least one entry of the TLB corresponding to at least one entry page that overlaps the input page.

18. A non-transitory processor-readable medium comprising:

a conditional translation lookaside buffer (TLB) write instruction;

wherein the conditional TLB write instruction includes an input virtual address and an input page size indication corresponding to an input page; and wherein the conditional TLB write instruction is executable by a processor that includes a TLB, the TLB including a first entry having an entry virtual address and an entry page size indication corresponding to an entry page, to:

determine a larger of an input page size represented by the input page size indication and an entry page size represented by the entry page size indication;

select the determined larger of the input page size and the entry page size as a selected page size;

perform a masked comparison, based on the selected page size, of the input virtual address to the entry virtual address to determine whether the input page overlaps the entry page;

after the masked comparison is performed, selectively perform a second masked comparison based on a determination, by the TLB, that the TLB contains an unexamined entry; and in response to determining that the input page does not overlap the entry page and to determining that the TLB does not contain the unexamined entry, write the input page size indication and the input virtual address to a second entry of the TLB.

19. The non-transitory processor-readable medium of claim 18, wherein the conditional TLB write instruction is further executable by the processor to maintain the entry page in the TLB in response to determining that the input page overlaps the entry page.

20. An apparatus comprising:

means for receiving an instruction at a translation lookaside buffer (TLB), the instruction including an input page size indication and an input virtual address corresponding to an input page;

means for determining a larger of an entry page size indication of an entry page of the TLB and the input page size indication;

means for selecting the determined larger of the input page size indication and the entry page size indication as a selected page size indication;

means for performing a first masked comparison, based on the selected page size indication, of the input virtual address to an entry virtual address corresponding to the entry page, to determine whether the input page overlaps the entry page and, after performing the first masked comparison, selectively performing a second masked comparison based on a determination, by the TLB, that the TLB contains an unexamined entry.

21. The apparatus of claim 20, wherein the instruction is an overlap check instruction or a conditional translation lookaside buffer (TLB) write instruction.

* * * * *